United States Patent
Inam (10) Patent No.: US 12,489,359 B2
(45) Date of Patent: Dec. 2, 2025

(54) POWER SUPPLY AND DEMAND SYNCHRONIZATION SYSTEM AND METHOD FOR MODULAR MULTI-PORT SYSTEM

(71) Applicant: DG Matrix, Inc., Raleigh, NC (US)

(72) Inventor: Haroon Inam, Raleigh, NC (US)

(73) Assignee: DG Matrix, Inc., Raleigh, NC (US)

( * ) Notice: Subject to any disclaimer, the term of this patent is extended or adjusted under 35 U.S.C. 154(b) by 0 days.

(21) Appl. No.: 18/940,267

(22) Filed: Nov. 7, 2024

(65) Prior Publication Data
US 2025/0192663 A1    Jun. 12, 2025

Related U.S. Application Data

(60) Provisional application No. 63/606,872, filed on Dec. 6, 2023.

(51) Int. Cl.
*H02J 4/00* (2006.01)
*H02M 1/00* (2006.01)
*H02M 1/10* (2006.01)
*H02M 7/219* (2006.01)
*H02M 7/5387* (2007.01)

(52) U.S. Cl.
CPC ....... *H02M 1/0067* (2021.05); *H02M 1/0054* (2021.05); *H02M 1/10* (2013.01); *H02M 7/219* (2013.01); *H02M 7/5387* (2013.01)

(58) Field of Classification Search
CPC .... H02M 1/0067; H02M 1/0054; H02M 1/10; H02M 7/219; H02M 7/5387
See application file for complete search history.

(56) References Cited

U.S. PATENT DOCUMENTS

| | | |
|---|---|---|
| RE43,572 E | 8/2012 | West |
| 9,397,580 B1 * | 7/2016 | Alexander .......... H02M 3/1582 |
| 9,647,568 B1 | 5/2017 | Bundschuh et al. |
| 9,866,016 B2 | 1/2018 | Terlizzi et al. |
| 9,871,379 B2 | 1/2018 | Cheng et al. |
| 9,973,107 B2 | 5/2018 | Varajão et al. |
| 10,439,432 B2 | 10/2019 | Eckhardt et al. |

(Continued)

FOREIGN PATENT DOCUMENTS

| | | |
|---|---|---|
| CN | 106452136 A | 2/2017 |
| WO | 2022046959 A1 | 3/2022 |

(Continued)

OTHER PUBLICATIONS

Kado, Y., D. Shichijo, K. Wada, and K. Iwatsuki (2016), Multiport power router and its impact on future smart grids, Radio Sci., 51, 1234-1246, doi:10.1002/2016RS006041.

(Continued)

*Primary Examiner* — Rexford N Barnie
*Assistant Examiner* — Esayas G Yeshaw
(74) *Attorney, Agent, or Firm* — NEO IP (57) ABSTRACT

A modular multiport converter system includes a plurality of distributed controllers, associated with different ports of the system that are able to synchronize to ensure that power drawn from the system is equal to power supplied to the system with precise timing. The distributed controllers are able to receive a clock signal from a leader controller, or from a vice leader controller in the event that leader controller is unable to function.

16 Claims, 6 Drawing Sheets

(56) References Cited

U.S. PATENT DOCUMENTS

| | | | |
|---|---|---|---|
| 10,608,545 B2 | 3/2020 | Keister et al. | |
| 10,734,914 B2 | 8/2020 | Azidehak et al. | |
| 11,031,785 B1 | 6/2021 | Erokhovets | |
| 11,063,579 B2 | 7/2021 | Beddingfield et al. | |
| 11,108,235 B1 | 8/2021 | Awal et al. | |
| 11,491,883 B2 | 11/2022 | Khaligh et al. | |
| 2005/0248964 A1* | 11/2005 | Dalal | H02M 3/33592 363/21.08 |
| 2015/0015071 A1 | 1/2015 | Deboy et al. | |
| 2015/0372604 A1 | 12/2015 | Balakrishnan et al. | |
| 2018/0090987 A1* | 3/2018 | Hashimoto | G05B 15/02 |
| 2018/0198377 A1 | 7/2018 | Keister et al. | |
| 2019/0312441 A1* | 10/2019 | Ballantine | H02J 3/14 |
| 2021/0408937 A1 | 12/2021 | Bhattacharya et al. | |
| 2023/0108060 A1 | 4/2023 | Krishnamoorthy et al. | |
| 2023/0170783 A1* | 6/2023 | Tian | H02M 1/007 363/17 |
| 2023/0327574 A1 | 10/2023 | Hawes et al. | |
| 2024/0088776 A1* | 3/2024 | Kadam | H02M 3/33561 |
| 2024/0356333 A1* | 10/2024 | Kasicheyanula | H02J 3/46 |
| 2025/0222793 A1* | 7/2025 | Su | H02J 7/0014 |
| 2025/0279730 A1* | 9/2025 | Liu | H02M 3/33573 |

FOREIGN PATENT DOCUMENTS

| | | |
|---|---|---|
| WO | 2022103858 A1 | 5/2022 |
| WO | 2022173791 A1 | 8/2022 |
| WO | 2022216738 A1 | 10/2022 |

OTHER PUBLICATIONS

Krishnaswami, Hariharan, Three-port DC-DC Converters to Interface Renewable Energy Sources with Bi-directional Load and Energy, University of Minnesota Dissertation published Aug. 2009.

M. La Mendola et al., "Four-Port Bidirectional Dual Active Bridge Converter for EVs Fast Charging," Roma Tre University, published 2019.

Mohamed A. Elkeiy et al., "Multiport DC-DC Converter with Differential Power Processing for Fast EV Charging Stations," MDPI, published Feb. 7, 2023.

Ritwik Chattopadhyay, "Three Port Transformer Isolated Phase Shifted DC-DC Converter Design & Control for Renewable Energy Source and Energy Storage Integration," North Carolina State University, published Aug. 16, 2018.

Shah, Suyash Sushilkumar et al., Optimized AC/DC Dual Active Bridge Converter using Monolithic SiC Bidirectional FET (BiDFET) for Solar PV Applications, published in 2021 IEEE Energy Conversion Congress and Exposition (ECCE), Oct. 2021, doi: 10.1109/ECCE47101.2021.9595533.

Shakil Ahamed Khan et al., "A New Isolated Multi-Port Converter with Multi-Directional Power Flow Capabilities for Smart Electric Vehicle Charging Stations," IEEE Transactions on Applied Superconductivity, published Jan. 27, 2019.

Subhashish Bhattacharya, "Monolithic SiC-based Bidirectional FET (BiDFET): Vehicle Electrification Opportunities," APEC, published Mar. 23, 2022.

Vishnu Mahadeva Iyer et al., "Extreme Fast Charging Station Architecture for Electric Vehicles with Partial Power Processing," North Carolina State University, published Mar. 4, 2018.

* cited by examiner

POWER SUPPLY AND DEMAND SYNCHRONIZATION SYSTEM AND METHOD FOR MODULAR MULTI-PORT SYSTEM

CROSS-REFERENCE TO RELATED APPLICATIONS

This application is related to and claims priority from the following US patents and patent applications: this application claims priority from and the benefit of U.S. Provisional Patent Application No. 63/606,872, filed Dec. 6, 2023, which is incorporated herein by reference in its entirety.

BACKGROUND OF THE INVENTION

1. Field of the Invention

The present invention relates to systems and methods for synchronizing power supply and demand nodes, and more specifically to synchronizing power supply and demand nodes in a modular multi-port system.

2. Description of the Prior Art

It is generally known in the prior art to provide methods to, for example, synchronize frequency and line voltage for multiple power sources operating in the same system, most notably in the instance of switching between primary and backup power supplies. Furthermore, at a grid level, it is generally known to provide responsive increases in power in response to actual or predicted demand loads during peak usage hours.

Prior art patent documents include the following:

U.S. Patent No. RE43572 for Bi-directional multi-port inverter with high frequency link transformer by inventor West, filed Aug. 16, 2010 and issued Aug. 14, 2012, discloses a multi-port power converter where all ports are coupled through different windings of a high frequency transformer. Two or more, and typically all, ports have synchronized switching elements to allow the use of a high frequency transformer. This concept and type of converter is known. This invention mitigates a number of limitations in the present art and adds new capabilities that will allow applications to be served that would otherwise not have been practical. A novel circuit topology for a four-quadrant AC port is disclosed. A novel circuit topology for a unidirectional DC port with voltage boost capabilities is disclosed. A novel circuit topology for a unidirectional DC port with voltage buck capabilities is disclosed. A novel circuit for a high efficiency, high frequency, bi-directional, AC semiconductor switch is also disclosed.

U.S. Patent Publication No. 20210408937 for MMC submodules scale-up methodology for mv and hv power conversion system applications by inventors Bhattacharya, et al., filed Jun. 24, 2021 and published Dec. 30, 2021, discloses modular multilevel converter (MMC) scale-up control methodologies which can be applied for MV and HV DC applications. In one example, an MMC includes first and second legs each with submodule (SM) groups connected in series, where each SM group includes a plurality of SMs; local group controllers that can control a corresponding SM group; and a central controller that can control output voltage of the MMC via the local group controllers. The local group controllers can provide capacitor voltage balancing (CVB) control of corresponding SM groups.

U.S. Pat. No. 10,608,545 for Power management utilizing synchronous common coupling by inventors Keister et al., filed Mar. 8, 2018 and issued Mar. 31, 2020, discloses apparatuses, systems, and methods for managing power utilizing synchronous common coupling. An apparatus comprises a synchronous common coupling, a plurality of ports, and a plurality of stacks connected through the synchronous common coupling. Each stack comprises at least one stage, with each stage comprising at least one source/load bridge, at least one flux bridge, and a DC bus. The at least one source/load bridge of one stage of each stack is connected to a source or load through one of the plurality of ports, the at least one flux bridge of each stage is connected to an electrically isolated winding in the synchronous common coupling, and the at least one flux bridge of each stage is connected to the at least one source/load bridge of the stage through the DC bus. The synchronous common coupling is configured to exchange power between each of the plurality of stacks.

U.S. Pat. No. 10,734,914 for Fault-tolerant controller for modular multi-level converters by inventors Azidehak et al., filed Sep. 26, 2019 and issued Aug. 4, 2020, discloses fault-tolerant controller architectures for multi-level converters. In one example, a multi-level converter includes an array of power modules. The power modules can include a controller communicatively coupled to controllers of adjacent power modules in the array of power modules. Circuitry of the controllers can receive operational data from the adjacent power modules; identify a fault condition in an adjacent power module using the operational data; and initiate reconfiguration of the array of power modules in response to an indication of the fault condition, where the reconfiguration bypasses the adjacent power module. In another example, a method includes identifying a fault condition in an adjacent power module in an array of power modules based upon operational data from one or more adjacent power modules of the array; and initiating reconfiguration of the array of power modules in response to an indication of the fault condition.

U.S. Pat. No. 11,063,579 for Circuit for providing variable waveform excitation by inventors Beddingfield, et al., filed Nov. 8, 2018 and issued Jul. 13, 2021, discloses a circuit for testing an electronic component, such as a transformer, including at least two power supplies and at least two H bridge circuits. A first H bridge circuit is conductively coupled in parallel to a first power supply. A second H bridge circuit is conductively coupled in parallel to a second power supply. The second H bridge circuit includes one or more anti-series diodes for preventing current from the first power supply from passing through the second H bridge circuit to the second power supply. The first H bridge circuit and the second H bridge circuit are configured to conductively couple to the electronic component for providing a voltage with a predefined waveform to the electronic component.

U.S. Pat. No. 11,491,883 for Vehicle on-board charger for bi-directional charging of low/high voltage batteries by inventors Khaligh et al., filed Apr. 10, 2019 and issued Nov. 8, 2022, discloses a compact light-weight on-board three-port power electronic system built in various configurations of triple-active-bridge-derived topologies, including modular implementations, with control strategies capable of bi-directional power transfer among the three ports of the power electronic system, including simultaneous charging of a high voltage (HV) battery and a low voltage (LV) battery from a single phase power grid or a three-phase power grid with minimized reactive power and active circulating current, with ensured soft-switching for MOSFET devices, and with enhanced synchronous rectification and reduced power losses.

U.S. Pat. No. 9,866,016 for Multiport power converter with load detection capabilities by inventors Terlizzi et al., filed Jul. 7, 2015 and issued Jan. 9, 2018, discloses power converters that convert alternating current (AC) power to direct current (DC) power. A power converter may have multiple ports. Each port may have an associated connector with multiple power and data terminals. When an electronic device is connected to a given port, the electronic device draws DC power from the power converter. To ensure that the capacity of the power converter is not exceeded when multiple devices are connected to the ports of the power converter, the power converter may actively monitor its ports for active loads. Load detection circuitry can determine what number of ports are active. Control circuitry can compute a per-port available DC power level based on the number of active ports and can provide this information to connected devices.

U.S. Pat. No. 10,439,432 for Highly flexible, electrical distribution grid edge energy manager and router by inventors Eckhardt et al., filed Mar. 27, 2015 and issued Oct. 8, 2019, discloses an electrical distribution grid energy management and router device, or GER device, installed in a distribution grid, and route power from power supply to one or more power consumers. The GER devices described herein may provide platforms to add one or more features to a distribution transformer, provide additional features and benefits to both the utility company and end consumer, and may serve as a platform for providing other features. A GER device may include sensors to measure electrical properties of incoming and outgoing power, and may include an electrical circuit layer having a central DC power stage. A GER device may include a physical layer providing a communications platform for one or more communication devices that may communicate with other GER devices to form a micro-grid, a utility, power consumers, third parties, and other electrical devices.

U.S. Pat. No. 9,871,379 for Smart microgrids and dual-output off-grid power inverters with DC source flexibility by inventors Cheng et al., filed Feb. 18, 2015 and issued Jan. 16, 2018, discloses a method and apparatus relating to smart microgrids supported by dual-output off-grid power inverters with DC source flexibility that can (1) intelligently and selectively pull power from one or multiple DC sources including solar panels, wind generators, and batteries based on certain criteria; (2) invert DC power to AC power; (3) supply the AC power to two off-grid circuits individually to power various types of AC loads that require different AC voltages, power quality, and power levels; (4) supply DC power through one or multiple DC output ports to power DC loads; and (5) charge batteries. Two or multiple dual-output off-grid power inverters can daisy-chain to form a group to support a larger microgrid which is ideal for off-grid AC Level 1 and Level 2 EV charging.

U.S. Pat. No. 11,031,785 for Device and method for intelligent control of power supply source connection by inventor Erokhovets, filed May 20, 2019 and issued Jul. 1, 2021, discloses providing continuous power supply to consumers at a minimal cost. The present device combines electrical power from a plurality of direct and alternating current sources while working together with or separately from an external electrical power grid. Inside of the device, generation sources are connected via DC/DC and AC/DC converters to a DC bus, to which batteries are also connected via a charge control system. DC current is converted into AC current through reversible AC/DC converters according to the number of grid phases and an AC bus is connected to said converters, allowing for energy from an external grid to also be used for charging the batteries. The method of control is based on a cyclical program for selecting energy sources, said program being executed by a control unit and having dynamic parameter correction that takes into account present and projected energy production and consumption.

U.S. Patent Pub. No. 2023/0108060 for System and method for providing uninterruptible power supply using one or more energy sources by inventors Krishnamoorthy et al., filed Oct. 6, 2022 and published Apr. 6, 2023, discloses a method and system of providing a power supply to a load using a micro-grid and an electrical grid without interrupting a power supply to the load during a power failure and restoration of the electrical grid. A non-grid AC sine wave is synchronized to a grid AC sine wave at the AC to AC synchronization circuit when the electrical grid power supply is restored, without turning OFF the DC to the AC inverter by performing synchronization of the non-grid AC sinewave to match the grid AC sine wave over a number of cycles to make the non-grid AC sine wave compatible with the grid power supply while the power supply generated from the non-grid sources remains uninterrupted and the voltage is in the predetermined threshold range for providing to the load.

U.S. Pat. No. 11,108,235 for Double synchronous unified virtual oscillator control for grid-forming and grid-following power electronic converters by inventors Awal et al., filed Feb. 11, 2021 and issued Aug. 31, 2021, discloses a power electronic converter utilizing exemplary double synchronous unified virtual oscillator control (DSUVOC) logic or circuitry to convert direct current to alternating current that is input into a power grid. An exemplary DSUVOC controller of the present disclosure includes a double synchronous space vector oscillator component, a sequence extraction component, a fault detection component, a pre-synchronization component, a virtual impedance component, a terminal voltage compensation component, and/or an active damping component, wherein the double synchronous unified virtual oscillator controller is capable of controlling a grid following or a grid forming power electronic converter enabling synchronization and fault ride-through under both balanced and unbalanced conditions.

U.S. Pat. No. 9,647,568 for Bi-directional multi-port applications by inventors Bundschuh et al., filed Feb. 17, 2014 and issued May 9, 2017, discloses methods and systems for bi-directional multi-port power conversion systems and applications. In some sample embodiments, current-modulating power converters can be used to provide conversion between synchronous and asynchronous power. In some sample embodiments, current-modulating power converters can perform power conversion can be performed to and from three-phase AC with an active neutral line. In some sample embodiments, current-modulating power converters can convert between synchronous and asynchronous power and also support three-phase AC with active neutral.

WIPO Publication No. 2022103858 for Multiport energy routing systems by inventors Mauger, et al., filed Nov. 10, 2021 and published May 19, 2022, discloses a flexible multiport energy routing system including a first port configured to connect to an AC grid, a plurality of second ports configured to connect to a plurality of devices, a step-down transformer, a power converter stack, and a third port. The step-down transformer can have a high voltage side electrically coupled to the first port and a low voltage side. The power converter stack can comprise a plurality of power converter modules each having a first converter bridge connected to the low voltage side of the step-down transformer and a second converter bridge connected to one or more of the plurality of second ports. Each of the power converter modules can have a converter transformer connected between the first and second converter bridges. The first and second converter bridges can bidirectionally manage AC and DC power flows between the first, second, and third ports.

WIPO Publication No. 2022216738 for Modular multiport AC battery power converter systems and methods of using same by inventors Mauger, et al., filed Apr. 5, 2022 and published Oct. 13, 2022, discloses a power conversion system including a first battery module, a second battery module, first and second transformers, and first, second, and third current source converter bridges. The transformers can have low voltage sides and high voltage sides. The first bridge can be configured to connect the battery modules and the low voltage sides of the transformers. A mid-point of the serial connection of the battery modules can be connected to a mid-point of the series connection of the transformers. The second bridge can connect to the high voltage side of the first transformer and one or more ports configured to transmit electrical power to and/or receive electrical power from an electrical load and/or source. The third bridge can be configured to connect to the high voltage side of the second transformer and the one and one or more ports.

WIPO Publication No. 2022046959 for Energy meters and energy monitoring systems and methods by inventors Kulkarni, et al., filed Aug. 26, 2021 and published Mar. 3, 2022, discloses energy meter including a current sensor and an interchangeable voltage sensor. The current sensor can be configured to measure an electrical current flowing through a conductor. The interchangeable voltage sensor detachably can be connected to the current sensor and configured to measure an electrical voltage carried by the conductor.

WIPO Publication No. 2022173791 for Unified control strategies for grid-connected converters by inventors Miranbeigi, et al., filed Feb. 9, 2022 and published Aug. 18, 2022, discloses a universal control (UniCon) scheme for grid-connected converters that allows operation automatically in grid-following, grid-firming, and grid-forming modes. The converter does not need information on the grid or connected sources and loads. The converter can set its own operating point based on local measurements. The converter can operate over a wide range of typically encountered steady-state, transient, and fault conditions. UniCon realizes a universal control strategy for converters on the grid, allowing operation in distinct modes, including dispatch in grid connected mode, and automatic load sharing in islanded or microgrid mode. Under transient conditions, the converters provide inertial support and improve damping to stabilize and reduce disturbances. Multiple converters on the system do not require detailed system knowledge or low-latency communications for fast coordination, using communications when available for slow coordination and system level optimization.

Chinese Patent No. 106452136 for A kind of multiport converters for energy internet, filed Jun. 20, 2016 and issued Apr. 2, 2019, discloses a kind of multiport converter for energy internet, belong to converters technical field. Converter of the invention is made of a static synchronous series compensator, a static synchronous compensator, a DC-DC converter and a three-phase DC-AC inverter. Static synchronous series compensator and static synchronous compensator are all based on Modular multilevel converter and constitute; DC-DC converter be by multiple isolation type DC-DC converters carry out input series connection, output-parallel and constitute, and with static synchronous series compensator and static synchronous compensator common high voltage DC bus. Converter of the invention integrates the function of THE UPFC and electric power electric transformer, has complementary advantages, and cost reduces; Using modular structure, be easy to extend and be arranged it is spare, it is with important application prospects in future source of energy internet.

The presentation "Monolithic SiC-based Bidirectional FET (BiDFET): Vehicle Electrification Opportunities" by author Bhattacharya, presented in March 2022, which discloses a Four Quadrant Switch (FQS), the characterization of SiC BiDFET, applications of BiDFET for vehicle electrification, and experimental results of a SiC BiDFET enabled grid-connected PV converter.

The article "Multiport DC-DC Converter with Differential Power Processing for Fast EV Charging Stations" by authors Elkeiy et al., published in February 2023, describes that, with the growing interest in owning electric vehicles due to increased environmental awareness and uncertain energy security together with the development of Li-ion batteries, quietness, and trouble-free operation, it is urgent to develop charging stations that are fast enough to supply the vehicles with energy conveniently, as in case of conventional petrol stations. The main reason that hinders the spread of fast charging stations is the installation cost, comprising the infrastructure and converter costs. In this article, a multiport DC-DC converter with differential power processing stages is proposed for Electric Vehicle (EV) fast charging stations, which results in a considerable reduction in the cost of using converters while achieving high efficiency. The proposed topology consists of two paths for the power flow (outer and inner loops) for EV battery charging with main and auxiliary DC-DC converters in the outer loop; all the ports are connected in series with the main supply, where the bulk power is being transferred. The main DC-DC converter injects a series voltage to control the power in the outer loop. The auxiliary DC-DC converters are rated at a fractional power that controls the partial power supplied to each port through the inner loops. Thanks to the fractional power processed by the auxiliary converter with the remaining power fed to the battery through the main converter, the proposed architecture enables simultaneous charging of multiple electric vehicles with better efficiency, lower cost, and the capability of providing a fault tolerance feature. A PWM control scheme for the converters to achieve bi-directional power flow in the partially rated DC-DC converters is discussed for the proposed system. Moreover, a practical down-scaled hardware prototype is designed to validate the functionality, control scheme, and effectiveness of the proposed topology in different case studies being investigated. The efficiency of the proposed converter is compared to the conventional configuration.

The article "Extreme fast charging station architecture for electric vehicles with partial power processing by authors Iyer et al., published in March 2018, describes a power delivery architecture for an Extreme Fast Charging (XFC) station that is meant to simultaneously charge multiple electric vehicles (EVs) with a 300-mile range battery pack in about 15 minutes. The proposed approach can considerably improve overall system efficiency as it eliminates redundant power conversion by making use of partial power rated dc-dc converters to charge the individual EVs as opposed to a traditional fast charging station structure based on full rated dedicated charging converters. Partial power processing enables independent charging control over each EV, while processing only a fraction of the total battery charging power. Energy storage (ES) and renewable energy systems such as photovoltaic (PV) arrays can be easily incorporated in the versatile XFC station architecture to minimize the grid impacts due to multi-mega watt charging. A control strategy is discussed for the proposed XFC station. Experimental results from a scaled down laboratory prototype are provided to validate the functionality, feasibility and cost-effectiveness of the proposed XFC station power architecture.

The article "A New Isolated Multi-Port Converter with Multi-Directional Power Flow Capabilities for Smart Electric Vehicle Charging Stations" by authors Khan et al., published on Jan. 28, 2019, describes that if the batteries are charged by clean renewable energy sources, electric vehicles (EVs) can have zero gas emission, contributing greatly toward the preservation of the green environment. In a smart micro-grid, EVs together with other distributed energy storage units can be used to supply electricity to the loads during the peak hours so as to minimize the effects of the load shedding and improve the quality of electricity. To achieve these goals, an isolated hybrid multi-port converter is required to control the power flows and balance the energy among renewable energy sources, EVs, and the grid. In this paper, a new isolated multi-port converter is proposed, which can control the power flow in multiple directions. The converter is modeled in the matlab/Simulink software environment and this validates the technology with a laboratory prototype test platform. The modeling, implementation, and results are discussed comprehensively.

The article "Four-Port Bidirectional Dual Active Bridge Converter for EVs Fast Charging" by authors La Mendola et al., published in 2019, describes the modeling of the isolated multiport bidirectional dual active bridge DC-DC Converter to be used in fast charging applications. The proposed topology uses four different full-bridge sections: the first full-bridge is able to manage the PV source, the second full-bridge is connected to a stationary storage system and can operate as either a source or a load, the remaining two full-bridges are able to manage the charging of the battery units up to two vehicles. All ports are connected through a high-frequency multi-winding transformer which allows to create a magnetic node. The analytical model of the four-port bidirectional dual active bridge DC-DC (4P-DAB) Converter is addressed in order to investigate the system behavior and to obtain the control law to manage the power flows between the ports. Switching model of a 100 kVA 4P-DAB Converter has been created in MATLAB/Simulink to validate the analytical model. The modes of operation of the proposed topology is then validated through the Hardware-In-the-Loop (HIL) test bench.

SUMMARY OF THE INVENTION

The present invention relates to systems and methods for synchronizing power supply and demand nodes, and more specifically to synchronizing power supply and demand nodes in a modular multi-port system.

It is an object of this invention to synchronize demand loads to power supply within a modular multiport system, such that addition of an additional load or a sudden increase in power demanded in an already active load is able to be matched to an amount of power being supplied to the system at the same moment to enable more responsive supply-demand matching.

In one embodiment, the present invention is directed to a system for synchronizing multiple power sources and/or multiple demand loads, including a central transformer connected to a plurality of ports, one or more DC sources or loads connected to the central transformer via one or more DC bridges, one or more AC sources or loads connected to the central transformer via one or more AC bridges, and at least one master controller configured to generate a clock signal and transmit the clock signal to one or more distributed controllers, wherein the one or more distributed controllers are operable to determine minimum delay timing for each of the plurality of ports.

In another embodiment, the present invention is directed to a method for synchronizing multiple power sources and/or multiple demand loads, including providing a power conversion system including a central transformer connected to a plurality of ports, one or more DC sources or loads connected to the central transformer via one or more DC bridges, one or more AC sources or loads connected to the central transformer via one or more AC bridges, at least one master controller, and one or more distributed controllers, the at least one master controller generating a clock signal and transmitting the clock signal to the one or more distributed controllers, and the one or more distributed controllers determining minimum delay timing for each of the plurality of ports.

In yet another embodiment, the present invention is directed to a system for synchronizing multiple power sources and/or multiple demand loads, including a central transformer connected to a plurality of ports, one or more DC sources or loads connected to the central transformer via one or more DC bridges, and one or more AC sources or loads connected to the central transformer via one or more AC bridges, wherein the one or more AC bridges include at least one silicon carbide (SiC) bidirectional field effector transistor (BiDFET) bridge, and wherein the one or more DC bridges include at least one dual active bridge.

These and other aspects of the present invention will become apparent to those skilled in the art after a reading of the following description of the preferred embodiment when considered with the drawings, as they support the claimed invention.

DETAILED DESCRIPTION

The present invention is generally directed to systems and methods for synchronizing power supply and demand nodes, and more specifically to synchronizing power supply and demand nodes in a modular multi-port system.

In one embodiment, the present invention is directed to a system for synchronizing multiple power sources and/or multiple demand loads, including a central transformer connected to a plurality of ports, one or more DC sources or loads connected to the central transformer via one or more DC bridges, one or more AC sources or loads connected to the central transformer via one or more AC bridges, and at least one master controller configured to generate a clock signal and transmit the clock signal to one or more distributed controllers, wherein the one or more distributed controllers are operable to determine minimum delay timing for each of the plurality of ports.

In another embodiment, the present invention is directed to a method for synchronizing multiple power sources and/or multiple demand loads, including providing a power conversion system including a central transformer connected to a plurality of ports, one or more DC sources or loads connected to the central transformer via one or more DC bridges, one or more AC sources or loads connected to the central transformer via one or more AC bridges, at least one master controller, and one or more distributed controllers, the at least one master controller generating a clock signal and transmitting the clock signal to the one or more distributed controllers, and the one or more distributed controllers determining minimum delay timing for each of the plurality of ports.

In yet another embodiment, the present invention is directed to a system for synchronizing multiple power sources and/or multiple demand loads, including a central transformer connected to a plurality of ports, one or more DC sources or loads connected to the central transformer via one or more DC bridges, and one or more AC sources or loads connected to the central transformer via one or more AC bridges, wherein the one or more AC bridges include at least one silicon carbide (SiC) bidirectional field effector transistor (BiDFET) bridge, and wherein the one or more DC bridges include at least one dual active bridge.

U.S. Provisional Patent Application No. 63/458,805, which is incorporated herein by reference in its entirety, describes a modular multiport power conversion system able to include multiple power supply and power load nodes. The '805 application describes both the physical system for permitting such a modular system and systems for managing the activation and dropping ports in a modular manner. However, one additional concern in managing modular multiport power conversion systems is synchronizing instantaneous loads and power supplies connected to the system. The issue of synchronization is important as lag in the amount of power supplied or the amount of load potentially leads to a situation where a sudden power draw from one load causes a significant power drop to other connected loads if a power source has not, at the same time, increased power provided. This potentially leads to issues in the functioning of critical loads (e.g., life support systems, critical infrastructure technology, etc.) that are deleterious to the public interest. On the other hand, sudden drops in demand, potentially caused by disconnection of a load from the system potentially lead to an overcharging of other devices, potentially even causing a short or otherwise damaging remaining connected loads due to instantaneous oversupply of power. Even if the mismatch of supply and demand is not damaging to the devices themselves, oversupply when not matched by a corresponding demand is wasteful, causing inefficiency on the grid. Mismatches in frequency due to poor synchronization, for example, often leads to high circulating currents that damage the stability of the system. Even where damage does not occur, a mismatch that leads power draw to outpace energy supplied into the system will at least cause the system to draw on energy from local energy storage systems (e.g., capacitor reservoirs) to balance the power flows, decreasing the total charge and lifespan of the energy storage systems.

Synchronization is important, in part, because physical limitation of the load devices and supply devices themselves mean that demand to draw power from a first load generated at a first time are not necessarily received at the same time as demands to draw power from other loads or notification of power availability from supply sources, even if all demands are made at the same time. Delays are often imposed by the transceivers, processing techniques, or due to resistance in the fibers used to transmit the signals, and each of these delays must be accounted for. These delays are especially important to account for as energy moves towards wind and solar energy, which do not have the stabilizing inertial effects of traditional energy sources and are therefore more susceptible to disturbances.

For traditional grids, especially those beginning to onboard solar and wind energy sources, techniques for grid synchronization have been approached by the prior art, as described in "Recent advances in synchronization techniques for grid-tied PV system" by authors Gawhade et al. (2021), which is incorporated herein by reference in its entirety. Types of approaches include zero crossing detection (ZCD), discrete Fourier transform (DFT), Kalman filters (KF), weighted least square estimation (WLSE), adaptive notch filtering (ANF), phase-locked loops (PLLs), and frequency locked loops (FLLs). For example, in one approach, grid controllers often utilize two control loops: an inner current loop and an external voltage loop. The inner loop in these systems is used for grid synchronization by controlling reactive power, generating a pulse width modulation (PWM) reference signal. The outer loop, on the other hand, is fed forward and helps to maintain a constant DC link voltage to extract maximum power. However, while these existing methods have seen some measure of success for traditional grid systems, challenges exist in adapting any synchronization technique to a modular multiport system that often has multiple power sources and multiple loads connected via windings to the same transformer, where ports could be dropped and added dynamically at any time. Therefore, an adequate synchronization technique is needed that is able to adapt to modular multiport systems.

Additionally, the '805 application presents several methods to schedule relative amounts of supply from different sources depending on the time of day (or time of month, time of year, etc.) based on estimated demand (itself potentially based on prior demand data). It also states that artificial intelligence or machine learning modules are able to be used to predict changes in demand over time so as to be able to control the modular multiport power conversion system to add, drop, increase supply from, or decrease supply from different power supply nodes over time. This is useful on a macro-level and especially for when there are not sudden, unexpected increases or decreases in demand, but synchronizing attached loads is often essential to make sure that supplied power is equal to or essentially equal to consumed power in the system. However, the issue is even more pressing for systems having multiple loads as the relative amount of power delivered to each node must be determined such that the power is appropriately allocated. Thus, a system is needed to precisely synchronize the demand from one or more nodes with the power supply provided from one or more nodes.

Referring now to the drawings in general, the illustrations are for the purpose of describing one or more preferred embodiments of the invention and are not intended to limit the invention thereto.

Figure 1:
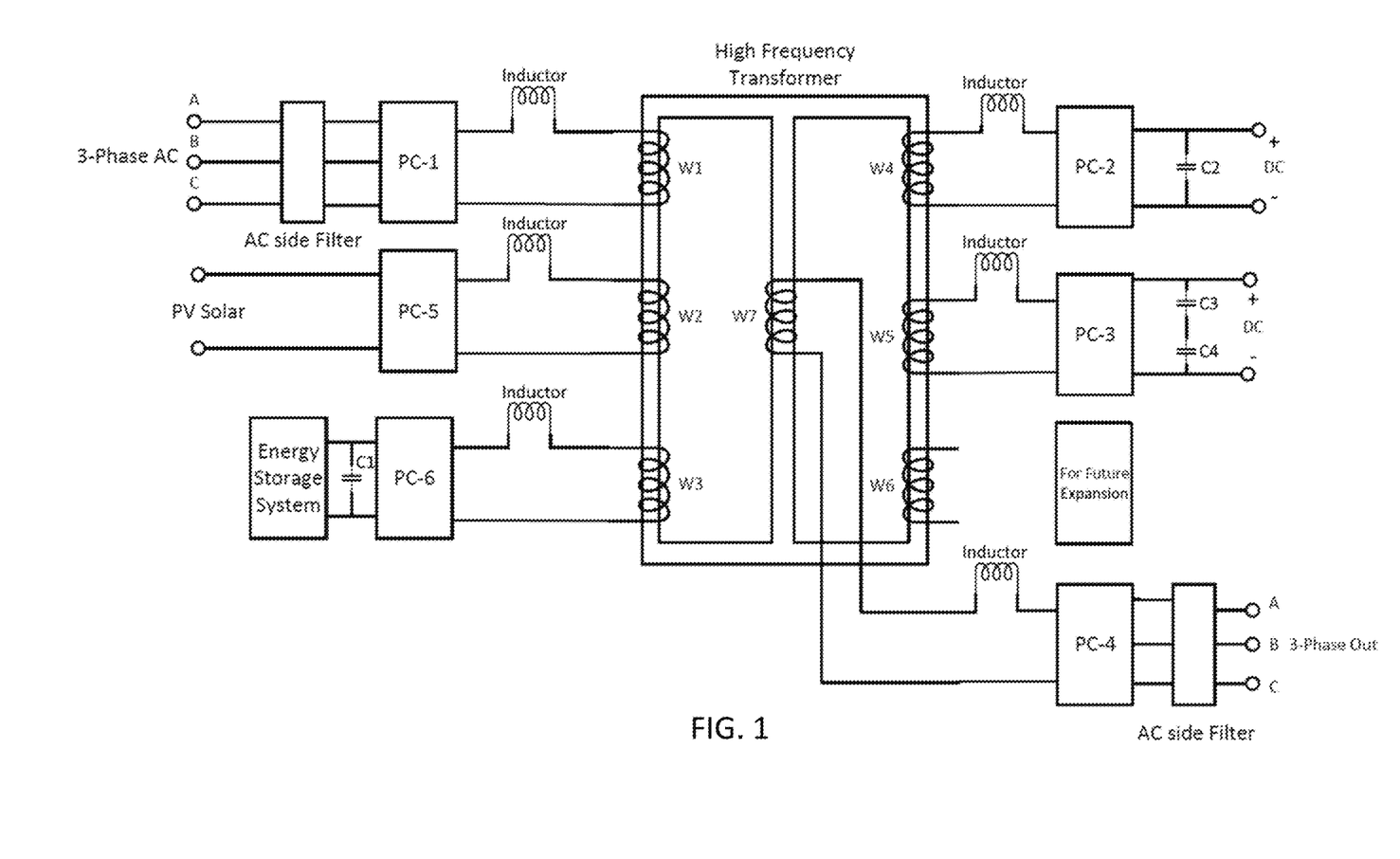
FIG. 1 is a circuit diagram of a modular, multiport power conversion system including seven ports according to one embodiment of the present invention.

FIG. 1 is a circuit diagram of a modular, multiport power conversion system including seven ports according to one embodiment of the present invention. The present invention includes a modular, multiport power conversion system (MM-PCS). The PCS includes a central transformer with a plurality of ports that form an integral part of the PCS. The ports are able to include both alternating current (AC) and direct current (DC) ports as either sources or sinks for power, allowing various power sources to be used to charge attached components. DC ports are able to have either positive or negative polarity, or split 3-wire ports with positive, zero, and negative voltage polarities. Furthermore, AC ports included in the PCS include single phase or three-phase AC ports. This is particularly useful for integrating a plurality of distributed energy resources and distributed energy storage systems for connecting those resources to various power consuming loads via a single PCS unit. This forms a sort of "matrix" of both sinks and sources that are able to be controlled simultaneously. The matrix is able to provide power transfer between any two (or more) of the ports, while able to isolate other ports, such that the system is able to selectively draw power from or transfer power to connected devices. The PCS is able to provide power simultaneously from a plurality of sources to a single power consuming load, or for multiple power consuming loads to draw power from a single power source simultaneously. In one embodiment, types of power sources able to be connected to the PCS include, but are not limited to, at least one battery, at least one solar cell, at least one wind turbine, at least one power plant, at least one microgrid, at least one steam turbine, at least one electric vehicle, and/or any other form of power supplying or power storage device.

The number of ports of the PCS is equivalent to the number of windings around the central transformer, with more windings providing possibilities for more energy sources or energy storage devices to connect to the system. In one embodiment, the PCS includes at least three, at least five, at least seven, at least nine, at least twenty, at least fifty, and/or any other number of windings, and therefore any number of corresponding ports. One of ordinary skill in the art will understand that the number of primary windings (i.e., windings that draw power from a source) and the number of secondary windings (i.e., windings that deliver power to a load) are not intended to be limited according to the present invention. Furthermore, primary windings are able to be connected to sources and loads and secondary windings are able to be connected to sources and loads, so the connectivity of primary or secondary windings to sources or loads or sinks is not intended to be limiting according to the present invention. Ports are able to be added or removed over time by adding (or enabling) or removing (or disabling) windings to the transformer, allowing for, by way of example and not limitation, a three-port PCS to later be used for a seven-port application, greatly improving scalability of the system. Instead of being thought of as being limited to a specific number of ports or connected devices, the scalability of the central PCS is only really limited by the volt-ampere (VA) rating of the central transformer. In one embodiment, the VA rating of the central transformer is between approximately 1 VA and approximately 1000 MVA. One of ordinary skill in the art will understand that the VA rating of transformers used in the present invention are not intended to be limiting and will depend on the application for which each PCS is used. It is also therefore important that, if new ports are added to the PCS at a later time, that the addition of the new ports not cause the transformer to exceed its VA rating.

In one embodiment, a first port (PC1) is a three-phase AC port, including an AC-side filter, and connected to the central transformer by a first winding (W1). In one embodiment, a second port (PC2) is a DC port including a single capacitor (C2) between the leads, and connected to the central transformer by a second winding (W2). In one embodiment, a third port (PC3) is a DC port including multiple capacitors (C3, C4) between the leads and connected to the central transformer by a third winding (W3). In one embodiment, a fourth port (PC4) is a three-phase AC port including an AC side filter and connected to the central transformer by a fourth winding (W4). In one embodiment, a fifth port (PC5) is connected to at least one solar cell and connected to the central transformer by a fifth winding (W5). In one embodiment, a sixth port (PC6) is a DC port connected to at least one energy storage system including at least one capacitor (C1) between the leads and connected to the central transformer by a sixth winding (W6). In one embodiment, a seventh winding (W7) is connected to the central transformer and is able to connect to and form a seventh node of any type.

The relative voltage drop or current supplied or drawn from the central transformer for each port is able to be modified based on a turn ratio for the winding for each port. This allows the transformer to step up or step down the voltage and/or current from individual sources or to individual sinks as needed to address a variety of needs, allowing for a more modular configuration of the PCS. Therefore, the same PCS is capable of acting as a buck converter (i.e., stepping down voltage) between one or more sources and one or more sinks or a boost converter (i.e., stepping up voltage) depending on the needs of the specific situation. Furthermore, in one embodiment, the central transformer includes a plurality of parallel circuit paths, such that additional windings (and therefore additional ports) are able to be added in series, which will increase the voltage rating of the combined port) or in parallel, which will increase the current rating of the combined port.

The central transformer of the PCS in the present invention provides galvanic isolation between each of the ports, reducing the danger of electric shocks or current cross-over between components connected to each port. The galvanic isolation is what mainly allows for selectivity in transferring power from one specific port A in the PCS to another specific port B, even if the PCS includes more ports than simply port A and port B. In one embodiment, a controller for the PCS is able to switch between islanding and grid connected modes for the PCS. The ability to individually isolate each port also allows for the system to easily cut off and replace individual ports with new ports, either for purposes of upgrade or repair, without turning off the PCS as a whole, providing for the ability to perform "hot swaps." Furthermore, failure of an individual port does not cause failure of the entire PCS, as the failed port is able to be easily isolated and cut off from the system.

The system is operable to automatically galvanically isolate and drop failed ports to prevent problematic transient loads. The system is capable of automatically dropping the failed node, rather than requiring manual removal of the source or load. In one example, if a port connection to a battery fails, the system automatically disconnects the port and takes synchronized action. This provides resiliency to the system. In one embodiment, in the event of a faulty port, the voltage for the faulty port is dialed (or programmed) to a predetermined "touch safe" voltage (e.g., by a controller connected to the PCS system). By way of example and not limitation, in one embodiment, the touch safe voltage is equal to approximately 0 V or is less than approximately 28 V. In one embodiment, faults at individual ports are detected by at least one fault detection algorithm, which is used to determine when the controller should dial, or program, the port to the touch safe voltage. Active control of the voltage conditions is useful for a shutdown and disconnect procedure for individual ports, while helping to prevent arc flashes, especially for DC ports. In one embodiment, active voltage control is also used when each port is ramped up into operating condition. Connection of the windings in series or in parallel on the transformer does not eliminate the advantage of galvanic isolation for the system, allowing for high selectivity and modularity for the added ports.

In one embodiment, the at least one fault detection algorithm operates, at least in part, based on data received from current sensors (e.g., open loop, closed loop, flux-gate, etc.) measuring current into and/or out of one or more of the individual ports. In one embodiment, the at least one fault detection algorithm operates, at least in part, based on data received from voltage sensors (e.g., capacitive-type voltage sensors, resistive-type voltage sensors, etc.) measuring voltage across one or more of the individual ports. In one embodiment, for one or more of the individual ports, the at least one fault detection algorithm detects faults based on lower-than-expected input current levels (i.e., an undercurrent condition), greater-than-expected output current levels (i.e., an overcurrent condition), less-than-expected voltage levels (i.e., an undervoltage condition), greater-than-expected voltage levels (i.e., an overvoltage condition), and/or detection of an arc. In one embodiment, arc fault detection is based on detection of a known high frequency signal coupled with one or more associated voltage or current levels. In one embodiment, the fault detection algorithm is based on detecting more than one fault condition simultaneously (e.g., an overcurrent condition and an undervoltage condition). In one embodiment, whether fault conditions occur "simultaneously" is based on whether they occur and/or are detected within a preset time period. In one embodiment, the preset time period is approximately 100 microseconds.

In one embodiment, each port is separately grounded, including its own ground reference, further providing for galvanic isolation. Furthermore, ports having separate grounding systems provides for improved scalability of the PCS in terms of both power and voltage output.

In one embodiment, one or more of the ports are capable of using zero-voltage switching (ZVS). ZVS is particularly useful for high-frequency applications, especially for power grid applications, as high-frequency circuits switch frequently and thus suffer more greatly from switching losses. ZVS utilizes pulse-width modification (PWM) operations to, in a first mode, delay the onset of a drain current in a switching transistor until the drain-source voltage over the transistor is zero and later, in a second mode, slows the rate of increase of the drain-source voltage while the drain current drops to zero. This greatly decreases the overlap between drain current and drain-source voltage, thereby decreasing parasitic power loss in the circuit, decreasing noise, and increasing the efficiency of the system. ZVS is especially beneficial in transformer-related applications, as it decreases transformer inductance loss as well. In one embodiment, the ZVS is achieved through inclusion of at least one resonant circuit between the source voltage connected to each port and the corresponding winding connected to the transformer for each port. In one embodiment, the switch includes at least one metal-oxide semiconductor field effect transistor (MOSFET) and/or at least one insulated-gate bipolar transistor (IGBT).

The magnetizing inductance of the transformer demonstrates a lagging current that is able to be designed as a specific fixed percentage of the full load rated current of the transformer. During light load current conditions, the magnetizing current essentially provides negative, or lagging, current during a switch voltage transition for the power converter. The negative, or lagging, current enables the system to discharge the device capacitance of the switches being turned on, which provides the zero voltage switching for the switch being turned on. Additionally, the negative, or lagging, magnetizing current enables charging the capacitor for the switch being turned off. With this system, a bulkier resonant circuit is not required.

In one embodiment, one or more of the ports are capable of using zero-current switching (ZCS). ZCS is, similarly to ZVS, very beneficial for high frequency applications. ZCS is similar to ZVS except that, in the first mode, it slows the rate of increase of the drain current, and, in the second mode, it delays the increase of the drain-source voltage until the drain current drops to zero. Similarly to ZVS, in one embodiment, the ZCS is achieved through inclusion of at least one resonant circuit between the source voltage connected to each port and the corresponding winding connected to the transformer for each port. In one embodiment, the switch includes at least one metal-oxide semiconductor field effect transistor (MOSFET) and/or at least one insulated-gate bipolar transistor (IGBT).

In one embodiment, each power supply source or load connected to a port of the modular multiport converter is connected to the converter via at least one gate driver. The gate driver is operable to receive power input from at least one of a plurality of distributed controllers, which produces an appropriate high current gate drive for the connected device. In one embodiment, the distributed controllers are synchronized with a real-time high-speed clock (e.g., 1 GHZ, 100 MHZ, etc.), allowing the distributed controllers to impose precise delays and to share data between each other at low speed (and/or exchange setpoints and reference times at lower speeds). However, the data sharing is also able to be sped up by utilizing multiple lines to communicate data packet as needed.

Figure 2:
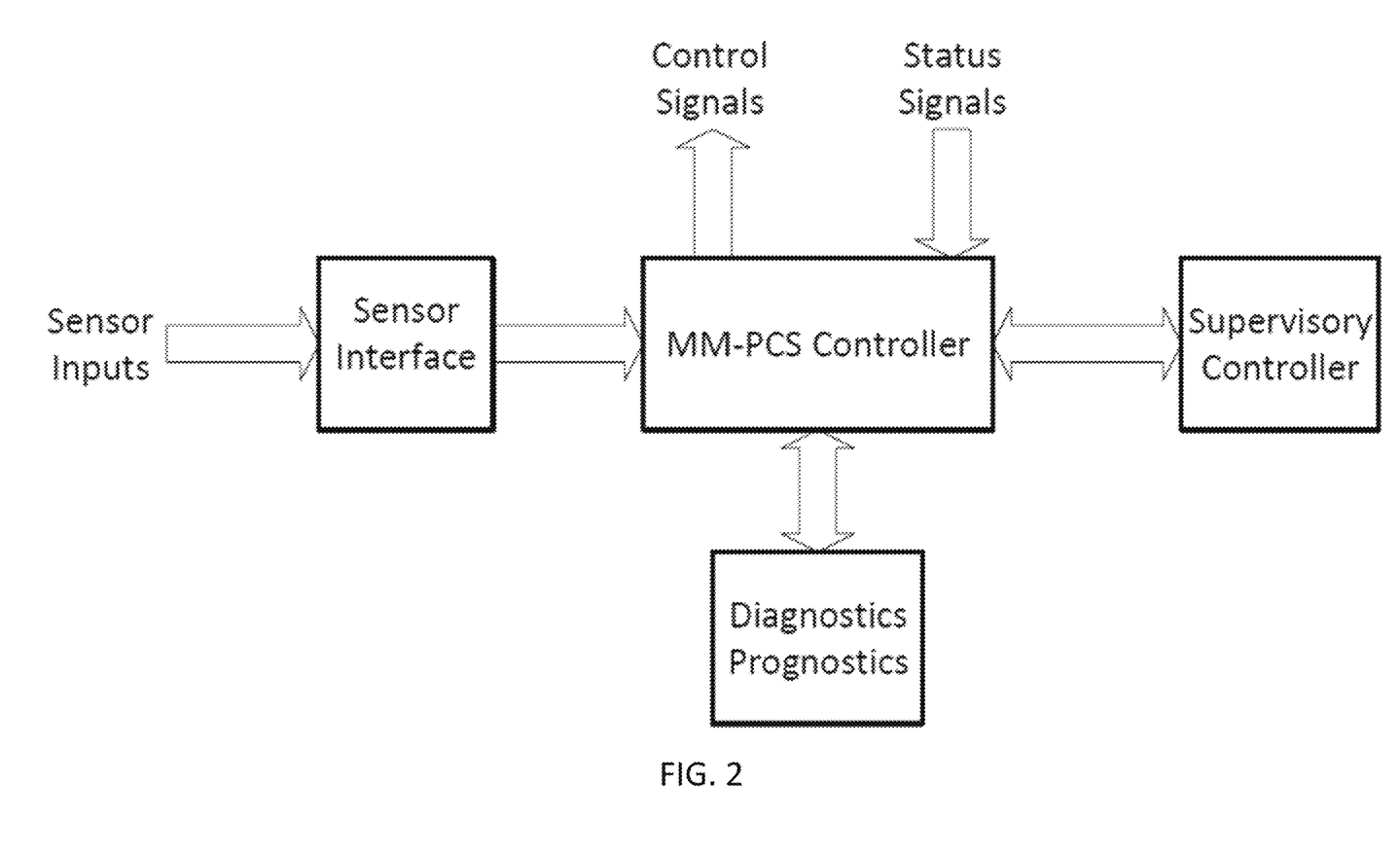
FIG. 2 is a schematic diagram of a system including a modular, multiport power conversion system according to one embodiment of the present invention.

FIG. 2 is a schematic diagram of a system including a modular, multiport power conversion system according to one embodiment of the present invention. In one embodiment, operation of the PCS is directed by at least one MM-PCS controller. In one embodiment, the MM-PCS controller is configured to receive status data from one or more sensors. In one embodiment, the PCS includes at least one sensor monitoring each port of the PCS. If a sensor detects that a port has failed, then a status update message is transmitted to the MM-PCS controller, allowing the MM-PCS controller to issue control signals to automatically galvanically isolate and cut-off the compromised port from central transformer, preventing the damaged ports from parasitically drawing current from the PCS or from potentially causing arc flashes or other harmful phenomena between the damaged port and other ports in the system. In one embodiment, the MM-PCS controller is able to connect or disconnect individual ports through the use of AC/DC contactors and/or vacuum circuit breakers on each port.

The galvanic isolation of the present system is achieved by the use of separate windings to connect each port to the transformer. Current is only able to flow from one winding to another winding by magnetic flux change in the transformer. This change requires explicit switching from each of the involved ports (or more specifically transistors in each port) to allow energy flow, providing for extremely high selectivity in flow path. In one embodiment, programmable contactors provide for selective remote (manual or automatic) transistor switching to allow for the selective switching mechanism. In one embodiment, the programmable contactors are operable to separate windings. This sort of switching also allows the transformer to provide controlled incoming current to individual loads even where the overall current from all energy resources into the system is quite high, preventing overcurrent from potentially damaging the attached loads.

In one embodiment, multiple PCS units are able to be connected either in series or in parallel, allowing for power scaling as well as voltage scaling of the system. In one embodiment, each PCS unit has its own controller for controlling the voltage supplied to each port of the corresponding PCS unit and allowing for control of power flow between each port. In one embodiment, a supervisory controller operates over multiple PCS units, providing higher level voltage regulation. In one embodiment, the supervisory controller is operable to transmit power flow control commands to one or more individual MM-PCS controllers and/or directly to individual ports of one or more PCS units. In an embodiment of the present invention having multiple PCS units, only the series or parallel ports are electrically connected. In one embodiment, the one or more individual MM-PCS controllers are connected to the at least one supervisory controller wirelessly via one or more dedicated signal frequencies, through at least one EtherCAT cable, and/or through one or more wireless networks (e.g., wireless local area networks, or WLAN, such as WI-FI, wireless personal area networks, or WPAN, such as BLUETOOTH). In one embodiment, one or more individual MM-PCS controllers are connected to at least one energy management system (EMS) (e.g., at least one server) operable to transmit commands to one or more individual MM-PCS controllers and/or to one or more supervisory controllers.

In one embodiment, the MM-PCS controller automatically performs diagnostic evaluations of the PCS based sensor data received from a plurality of sensors, allowing the MM-PCS controller to synthesize this data to determine the overall health of the system. In one embodiment, diagnostics and prognostics are performed by a dedicated diagnostic and prognostic module interfaced with the MM-PCS controller. In one embodiment, the diagnostic and prognostic module is a cloud-based module, while, in another embodiment, the diagnostic and prognostic module is a component of a processor of the MM-PCS controller. In one embodiment, the MM-PCS controller is configured to automatically transmit status updates from the PCS as a whole to at least one server and/or at least one database. In one embodiment, the MM-PCS controller is connected, either via cable or wirelessly, to at least one supervisory controller operable to provide new operational parameters to the MM-PCS controller to adjust to different needs of the system (e.g., adjusting a maximum total voltage drop, adjusting a maximum current drawn by specific sinks, etc.). In one embodiment, the MM-PCS controller is capable of controlling a percentage of power delivered or consumed by each port (e.g., port 1 delivers 20% of power, port 2 delivers 80% of power, etc.). In another embodiment, the amount of power delivered or consumed by each port is based on the number of windings in each port's connection to the central transformer.

In one embodiment, ports are turned on or off, it needs to be determined how much power is being demanded from each output port. In one embodiment, a controller connected to each power supply source and/or each load sends a signal, including time-stamped metadata, to a central third-party controller, when an amount of power demanded or an amount of power supplied changes for the device. This allows the third-party controller to then coordinate reallocation of energy resources within the modular multiport converter. In one embodiment, the third-party controller coordinates its own timings to dynamically match supply and demand entering the system. This system is advantageous as it allows for precise coordination without actually requiring real time clocks, as the controller's discretion manages the supply-demand tracking, rather than real time inputs. However, this system also necessitates some amount of additional delay for allowing coordination and therefore is potentially not preferable for highly dynamic and fast changing systems. In another embodiment, a central third-party intermediary controller is not utilized and the distributed controllers communicate directly with each other. In one embodiment, in order to change the power drawn or power supplied through individual ports, the controllers are operable to manipulate at least one switch and/or otherwise affect an impedance associated with each port.

In one embodiment, each time a new device is connected to the modular multiport converter system, the distributed controllers automatically calculate a delay time for each connected device by measuring an amount of time required for a call and response signal and dividing by two. By determining the delay time for each device, the system is then able to automatically impose a response delay of at least the maximum delay timing of all connected devices, ensuring that the system is able to account for the delay of any connected devices. This allows for an easy rule for determining delay of individual devices, though it is reliant on each device having a relatively consistent delay timing and on the response time to the controller and back being substantially equal. In one embodiment, if a controller does not receive a response from a device (or does not receive a response within a preset threshold amount of time, e.g., one minute), then the node is assumed to be disconnected and the delay time from that node is not factored into the synchronization.

In one embodiment, distributed controllers/gate drive boards are then able to coordinate such that a minimum delay time (in responding to increases in demanded power from individual nodes associated with the distributed controller) is imposed on each controller equal to the maximum delay time of any node in the system, therefore allowing devices to respond simultaneously to changes in the supply and demand state of the system. In one embodiment, distributed controllers from separate multiport systems are able to cross-communicate to synchronize a plurality of multiport converter systems. This is especially useful in situations where, at a macro-level, decreases in total power demand for one multiport system is lower than average, while demand for another spikes, for example, in a situation where one user is away and therefore not drawing power, but a neighboring user has a spike in demand, which allows reallocation of power supply resources at a more macro-level. In one embodiment, synchronization time stamps are different for different levels of organization (e.g., for grid elements connected to and controlled by the same controller versus for different ports controlled by different, distributed controllers versus for entirely separate multiport systems). Therefore, in one embodiment, controllers associated with each port are able to synchronize signals from elements within the same port at different intervals/sampling rates compared to the intervals or sampling rates at which all of the distributed controllers within the multiport system synchronize with each other.

In another embodiment, one controller is a designated leader controller that provides a clock signal to other, follower distributed controllers for a multiport converter system (or a plurality of multiport converters). In one embodiment, a second controller is a designated vice-leader that provides a backup clock signal to the other distributed controllers in the event that the designated leader controller malfunctions, loses signal, or otherwise is unable to carry out its role.

In one embodiment, one or more controllers operable to control the modular multiport converter system are operable to transmit status information regarding one or more ports (preferably each port) of the modular multiport converter system to a processor. In one embodiment, the one or more controllers have a sampling rate for each port of approximately 1 MHz, allowing for true real-time information to be gathered for each port. In one embodiment, the status information includes an amount of power currently being supplied or drawn by each port, an average amount of power supplied or demanded over one or more periods of time by each port, a frequency of each port, and/or other information. In one embodiment, based on the status information, the processor is able to generate a real time representation of the ports, advantageously providing indications of which ports are providing or drawing the most power, or which ports have the greatest variability in power supplied or demanded. In one embodiment, the real time representation is a visual representation shown on at least one display connected to the processor. In one embodiment, the real time representation provides a digital twin of the modular multiport converter system that is manipulable by a user. For example, in one embodiment, the processor is able to receive a command to override automatic operation of the controller and to cut off power supplied to any given port, cut off power drawn from any given port, increase power supplied to a given port, and/or increase power supplied by a given port, so as to provide manual hands-on operation of the system in the event that factors must be addressed that the controller cannot adequately take into account. For example, if, during a storm, a specific power consuming device is heavily damaged and there is a concern about the device short circuiting, an operator is able to manually cut power to that port, even if the controller does not detect the issue.

In addition to synchronizing the timing of needed supply and demand, it is also important that the system synchronize the phase of the ports. In a preferred embodiment, phase-locked loops are used for phase matching and synchronization of the phase of the signals from each port. However, in another embodiment, one or more other known techniques for phase matching are used to synchronize the phase of the signals, including but not limited to, frequency-locked loops (FLLs), delay-locked loops, zero-crossing detection (ZCD), and/or one or more other known phase and frequency synchronization techniques. PLLs used in the present invention are able to be constructed in any way known in the prior art, including the use of a phase comparator to compare the phase of a specific port to the phase of one or more reference ports, and a voltage controlled oscillator used to control the frequency and/or phase of the signal, such that the oscillator allows matching of the port parameters to that of the one or more reference ports.

The use of PLLs is important for the converters used in the system to synchronize with an AC grid or AC generator's phase and frequency. In one embodiment, when the AC converter is used as an output port, the AC converter specifically includes a PLL to ensure that the respective output current from the port is in-phase or has the appropriate phase shift to match the system per the incoming grid voltage for controlling the power outflow to the grid. Alternatively, when the AC converter is used more as an input port, the PLL is used to synchronize the input AC voltage for power inflow from the grid. Preferably, the system utilizes a digital PLL enacted through one or more onboard controllers for the modular, multiport system. This digital PLL allows the system to quickly adapt to dynamic grid conditions, such as identifying grid sag and fault conditions and accordingly changing the device operating mode and/or state if such change is necessary to maintain synchronization with the grid during these disturbances. The digital PLLs also facilitate a greater number of adaptable control elements and respective gains for maintaining synchronization with respective input ports or output ports during grid disturbances.

Figure 3:
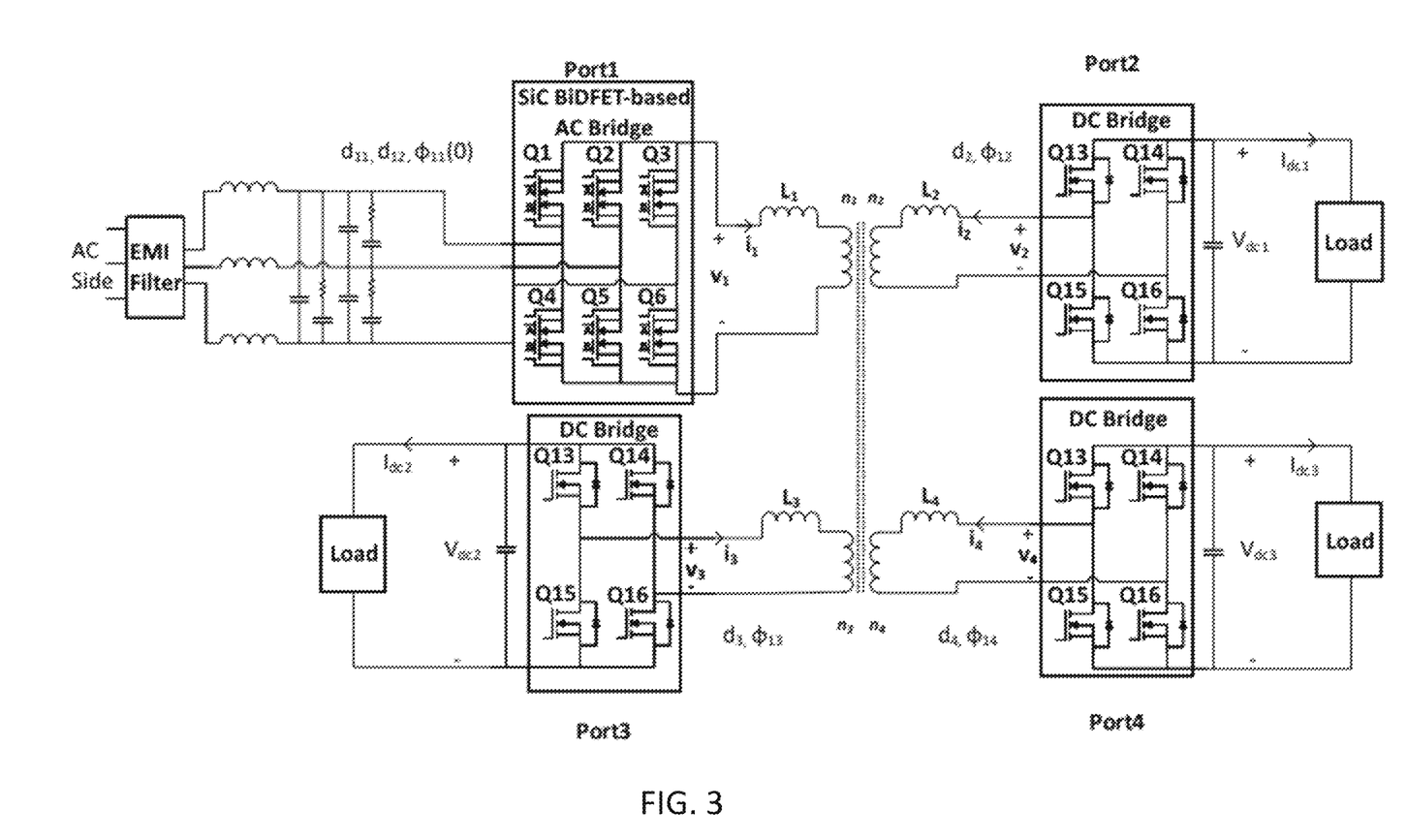
FIG. 3 is a circuit diagram of a modular, multiport power conversion system including four ports according to one embodiment of the present invention.

FIG. 3 is a circuit diagram of a modular, multiport power conversion system including four ports according to one embodiment of the present invention. As is shown in FIG. 3, the modular, multiport system is able to be connected to both AC and DC loads. In one embodiment, DC loads are connected to the central transformer by a DC bridge. The turns ratio for the circuit shown is generalized as $n_1:n_2:n_3:n_4$. Each port injects a square wave having a duty cycle, $d_n$, and a phase shift, $PHI1_n$. The phase shift is defined with respect to the AC port, which is assigned an arbitrary phase shift of 0, with the range of phase shift for each other port varying between $[0,\pi]$. Power transfer is then able to be controlled by controlling the phase shift and duty cycle of each port's respective voltage.

In one embodiment, each DC bridge includes a plurality of transistors, denoted Q13, Q14, Q15, and Q17 in FIG. 3. In one embodiment, the DC bridge is a dual active bridge, which provides for soft switching capabilities. In one embodiment, AC loads are connected to the central transformer by an AC bridge. The AC bridge has several unique characteristics relative to the DC ones, including the ability to block voltage in both directions, eliminating a need for a prior rectification stage. Furthermore, a three-phase embodiment implements a 3×2 matrix converter where the two highest phase voltages are used to generate a stepped-square wave during a normal switching cycle. Therefore, in this embodiment, two variable duty cycles are assigned for the voltage steps of the port. In one embodiment, the AC bridge is a silicon carbide (SiC) bidirectional field effector transistor (BiDFET) bridge. In one embodiment, the BiDFET bridge is designed in line with the four quadrant switch and/or any other BiDFET device disclosed in the presentation Monolithic SiC-based Bidirectional FET (BiDFET): Vehicle Electrification Opportunities by Subhashish Bhattacharya for North Carolina State University in March 2022, which is incorporated herein by reference in its entirety. However, in another embodiment, the AC bridge includes back-to-back transistors, providing similar functionality to the BiDFET, but with larger size and lower cost of development.

Figure 4:
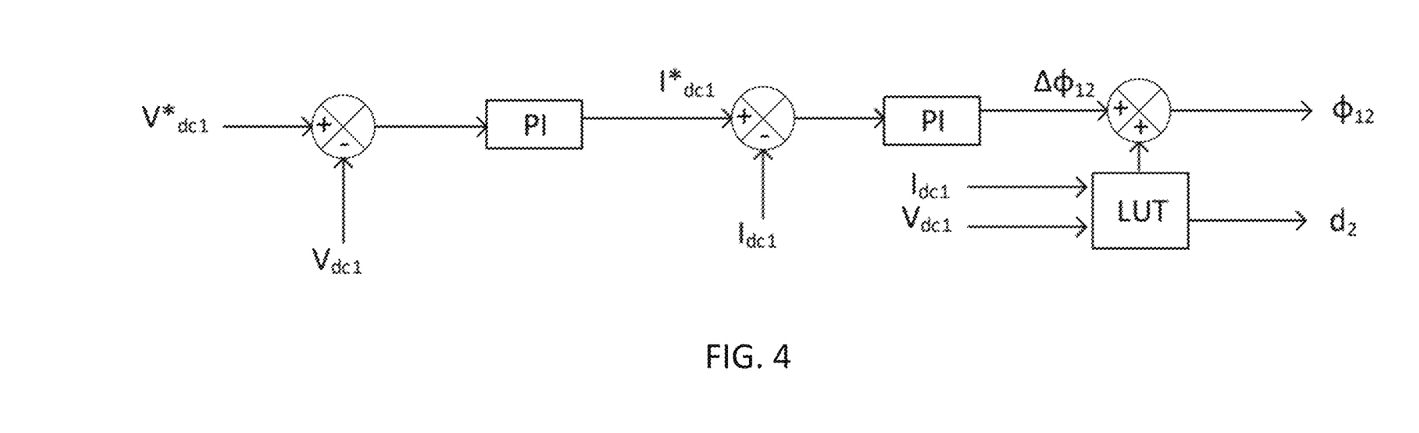
FIG. 4 is a schematic diagram of a control system for a first DC port according to one embodiment of the present invention.
Figure 5:
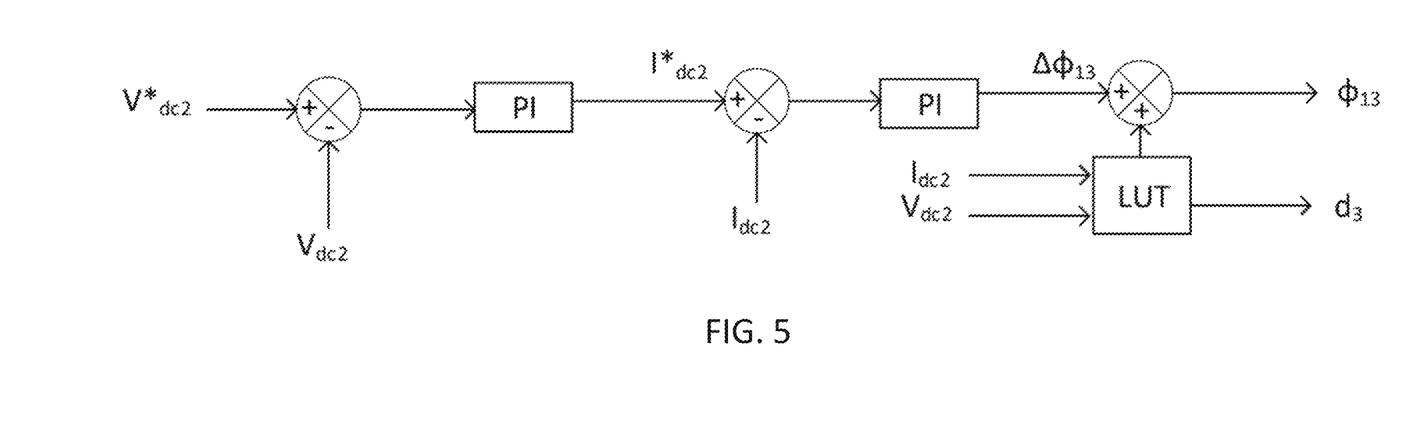
FIG. 5 is a schematic diagram of a control system for a second DC port according to one embodiment of the present invention.
Figure 6:
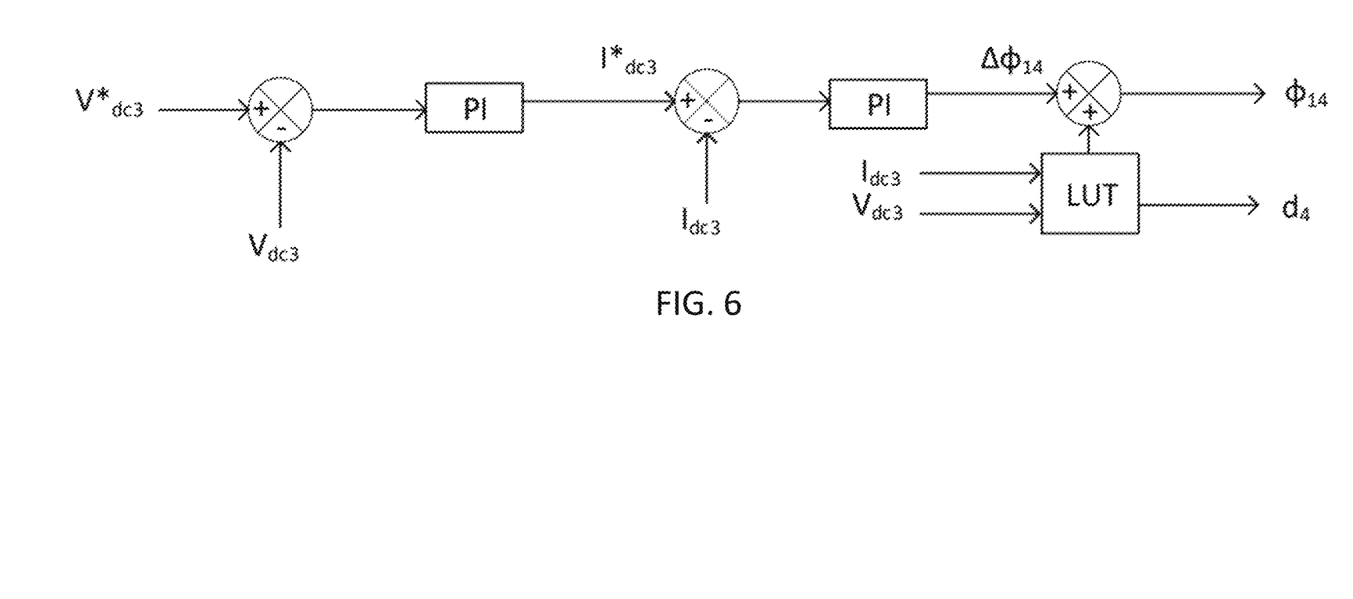
FIG. 6 is a schematic diagram of a control system for a third DC port according to one embodiment of the present invention.

FIGS. 4-6 are schematic diagrams of control systems for use with DC ports in the present invention. As shown in FIGS. 4-6, the voltage controls are able to operate independently for each port. In one embodiment, the power supply for each port is entirely decoupled as well. For each port, voltage regulation is able to be done using an outer voltage loop with a faster, inner current control loop. In one embodiment, the outer loop generates a current setpoint, while the inner loop is responsible for generating phase shift for the relevant port. In one embodiment, look-up tables (LUTs) are utilized to provide a feed-forward control of the ports. Given the input voltage and current parameters, the LUTs are able to be used to determine a port's phase and duty cycle. The use of sophisticated LUTs is also able to be used to provide power decoupling by feeding in all ports' current and voltage parameters. In one embodiment, the LUTs are used to optimize one or more of the following parameters for one or more ports: transformer root mean square (RMS) current, switch RMS current, zero-voltage switching for minimizing power losses, minimization of reactive power, and/or power-factor minimization.

Figure 7:
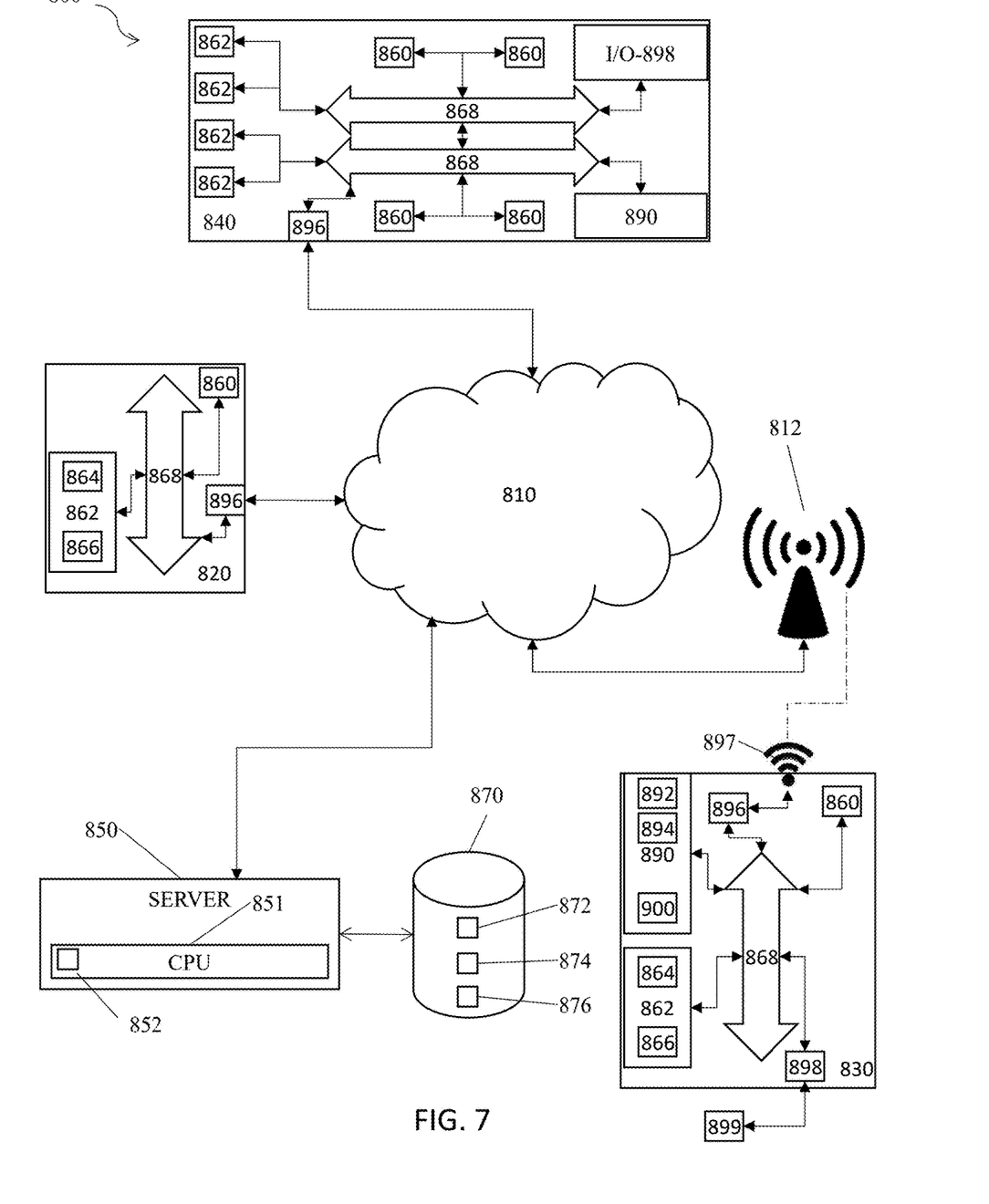
FIG. 7 is a schematic diagram of a system of the present invention.

FIG. 7 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 7, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 7, is operable to include other components that are not explicitly shown in FIG. 7, or is operable to utilize an architecture completely different than that shown in FIG. 7. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for synchronizing multiple power sources and/or multiple demand loads, comprising: a central transformer connected to a plurality of ports; one or more DC sources or loads connected to the central transformer via one or more DC bridges; one or more AC sources or loads connected to the central transformer via one or more AC bridges; and at least one master controller configured to generate a synchronization signal and transmit the synchronization signal to one or more distributed controllers; wherein the one or more distributed controllers are operable to determine minimum delay timing for each of the plurality of ports.

2. The system of claim 1, wherein the one or more AC bridges include at least one silicon carbide (SiC) bidirectional field effector transistor (BiDFET) bridge.

3. The system of claim 1, wherein the one or more DC bridges include at least one dual active bridge.

4. The system of claim 1, wherein each of the plurality of ports are galvanically isolated.

5. The system of claim 1, wherein the at least one master controller and/or the one or more distributed controllers utilize phase-locked loops (PLLs) to synchronize the plurality of ports.

6. The system of claim 1, wherein the at least one master controller is configured to automatically drop connections to one or more of the plurality of ports if the one or more of the plurality of ports is detected to have failed.

7. The system of claim 1, wherein the system utilizes look-up tables (LUTs) to provide feed-forward control of the plurality of ports.

8. The system of claim 1, wherein the at least one master controller or the one or more distributed controllers are operable to connect or disconnect individual ports through the use of AC/DC contactors and/or vacuum circuit breakers on each of the plurality of ports.

9. A method for synchronizing multiple power sources and/or multiple demand loads, comprising: providing a power conversion system including: a central transformer connected to a plurality of ports; one or more DC sources or loads connected to the central transformer via one or more DC bridges; one or more AC sources or loads connected to the central transformer via one or more AC bridges; at least one master controller; and one or more distributed controllers; the at least one master controller generating a synchronization signal and transmitting the synchronization signal to the one or more distributed controllers; and the one or more distributed controllers determining minimum delay timing for each of the plurality of ports.

10. The method of claim 9, wherein the one or more AC bridges include at least one silicon carbide (SiC) bidirectional field effector transistor (BiDFET) bridge.

11. The method of claim 9, wherein the one or more DC bridges include at least one dual active bridge.

12. The method of claim 9, wherein each of the plurality of ports are galvanically isolated.

13. The method of claim 9, further comprising the at least one master controller and/or the one or more distributed controllers utilizing phase-locked loops (PLLs) to synchronize the plurality of ports.

14. The method of claim 9, further comprising the at least one master controller automatically dropping connections to one or more of the plurality of ports when the one or more of the plurality of ports is detected to have failed.

15. The method of claim 9, further comprising utilizing look-up tables (LUTs) to provide feed-forward control of the plurality of ports.

16. The method of claim 9, further comprising the at least one master controller or the one or more distributed controllers connecting or disconnecting individual ports through the use of AC/DC contactors and/or vacuum circuit breakers on each of the plurality of ports.

* * * * *